(12) United States Patent
LeDuc

(10) Patent No.: US 12,089,564 B1
(45) Date of Patent: Sep. 17, 2024

(54) PORCUPINE DECOY

(71) Applicant: Tony LeDuc, Gaspé (CA)

(72) Inventor: Tony LeDuc, Gaspé (CA)

( * ) Notice: Subject to any disclaimer, the term of this patent is extended or adjusted under 35 U.S.C. 154(b) by 91 days.

(21) Appl. No.: 17/363,865

(22) Filed: Jun. 30, 2021

(51) Int. Cl.
*A01K 15/02* (2006.01)
*A01M 29/24* (2011.01)
*A01M 31/06* (2006.01)

(52) U.S. Cl.
CPC ......... *A01K 15/021* (2013.01); *A01M 29/24* (2013.01); *A01M 31/06* (2013.01)

(58) Field of Classification Search
CPC ..... A01K 15/00; A01K 15/021; A01M 29/24; A01M 31/06; A63H 3/36; A63H 33/26
See application file for complete search history.

(56) References Cited

U.S. PATENT DOCUMENTS

| | | | | | |
|---|---|---|---|---|---|
| 4,852,288 | A * | 8/1989 | Payne | ............... | A01M 31/06 43/2 |
| 5,186,651 | A * | 2/1993 | Fuchs | ............... | H01R 12/777 439/495 |
| 5,572,824 | A * | 11/1996 | Szolis | ............... | A01M 31/06 43/3 |
| D417,239 | S | 11/1999 | Sullivan | | |
| 9,726,455 | B2 | 8/2017 | Ngeyi | | |
| 2005/0022751 | A1* | 2/2005 | Nelson | ............... | A63H 11/00 119/709 |
| 2006/0213449 | A1* | 9/2006 | Dodge | ............... | A01M 31/002 119/329 |
| 2007/0289201 | A1* | 12/2007 | Kleinert | ............... | A01M 29/24 340/573.2 |
| 2012/0312248 | A1* | 12/2012 | Alves | ............... | A01M 29/06 119/712 |
| 2016/0029598 | A1* | 2/2016 | Simon | ............... | A01K 15/026 119/707 |
| 2017/0102206 | A1* | 4/2017 | Ngeyi | ............... | F41B 7/003 |
| 2017/0245467 | A1* | 8/2017 | Greiner | ............... | A47C 31/10 |
| 2018/0192638 | A1* | 7/2018 | Denmon | ............... | A01M 31/06 |
| 2019/0124887 | A1* | 5/2019 | Seppälä | ............... | A01K 15/021 |
| 2020/0296928 | A1* | 9/2020 | Mott | ............... | A01K 13/006 |

OTHER PUBLICATIONS

Bradford, Alina, Facts about Porcupines, Sep. 30, 2016, https://www.livescience.com/56326-porcupine-facts.html (Year: 2016).*
NCERT CBSE Physics Standard 11 Kinetic Theory of Gases Chapter 12 SKMClasses Bangalore by Subhashish Sir. Instructional Document [online]. SKM Classes Bangalore [retrieved on Aug. 10, 2020]. Retrieved from the Internet: <URL: https://zookeepersblog.wordpress.com/ncert-cbse-physics-standard-11-kinetic-theory-of-gases-chapter-12/>.
George Hardy Porcupine by Ryan King. Product Listing [online]. Pinterest.com [retrieved on Aug. 10, 2020]. Retrieved from the Internet: <URL: https://www.pinterest.com/pin/29203097570773660/>.
Northern Plains Roach. Product Listing [online]. © 2021 Cisco's Gallery [retrieved on Aug. 10, 2020]. Retrieved from the Internet: <URL: https://ciscosgallery.com/products/northern-plains-roach-p1773>.

* cited by examiner

*Primary Examiner* — David J Parsley
*Assistant Examiner* — Kari A Bradberry
(74) *Attorney, Agent, or Firm* — Cramer Patent & Design PLLC; Aaron R. Cramer

(57) ABSTRACT

A porcupine decoy comprises a decoy shaped in appearance to resemble a porcupine. The decoy is battery operated and capable of administering an electrical shock or pepper spray when disturbed. The porcupine also emits a porcupine scent.

1 Claim, 5 Drawing Sheets

PORCUPINE DECOY

RELATED APPLICATIONS

None.

FIELD OF THE INVENTION

The present invention relates generally to a decoy and more specifically to a porcupine decoy.

BACKGROUND OF THE INVENTION

Wild porcupines and dogs have been crossing paths for generations, often with disastrous results for the dog. Whether it is a family pet who happens to live near the habitat of porcupines or a hunting dog that approaches while off leash, the unfortunate result is usually a muzzle full of painful quills. This usually necessitates a trip to the local vet for removal along with medication to prevent infection. This is not only painful for the dog but results in expensive medical bills and at home care for the pet for weeks afterwards. While most dogs will avoid future confrontations with porcupines, even the first confrontation is too much for many owners and their pets, as death of the dog may happen. Accordingly, there exists a need for a means by which dogs can be trained to avoid porcupines before an encounter ever happens. The development of the porcupine decoy fulfills this need.

SUMMARY OF THE INVENTION

The principles of the present invention provides for a porcupine training decoy having a porcupine body shell which has a backside, a porcupine head, a plurality of porcupine feet, a tail, an adult porcupine impression which includes the porcupine body shell, the porcupine head, the porcupine feet, and the tail, a plurality of quills extending from the backside of the porcupine body shell, a weight reservoir which is disposed under the backside of the porcupine body shell, at least one aromatic fabric patch which is disposed on an upper surface of the porcupine body shell, an electronics enclosure accessed through a slot in a lower forward portion of the porcupine body shell, an electrical connector allowing the electronics enclosure to be disconnected from an internal wiring harness, an electrical circuit from the electronics enclosure routed through the electrical connector and the internal wiring harness, and a single conductor terminating on an interior portion of a quill connector. The weight reservoir is accessed by a reservoir fill port disposed on the weight reservoir.

The porcupine body shell may be hollow. The tail may be a 15 in. tail. The quills may be made of a semi-flexible conductive material selected from the group consisting of semi-conductive plastic, metal, aluminum, copper, or steel. The weight reservoir may provide stability for the porcupine training decoy and prevents the porcupine training decoy from being blown over or accidentally knocked over. The weight reservoir may be filled with a material selected from the group consisting of sand, water, or grain. The at least one aromatic fabric patch may house a synthetic scent that is dispersed. The synthetic scent may be adapted to recreate a natural smell of a porcupine. The synthetic scent may be C10H18O2.

The electronics enclosure may include a power switch and a voltage level controller to control operation of the porcupine training decoy. The electronics enclosure may be removed to allow for battery charging, battery replacement, battery repair or battery long-term storage of the porcupine training decoy. The internal wiring harness is connected to a plurality of ground plates. Each of the ground plates may be located in one of the porcupine feet. The internal wiring harness may be connected to the quills. The electrical circuit may then be completed by a pet-in-training that runs from a spring-loaded second contact point on the pet-in-training and the ground plates. The electrical circuit generates an electrical shock at the pet-in-training and the intensity level of the electrical shock is varied by adjustment of the voltage level controller.

The single conductor may terminate on a spring-loaded quill contact on a side of the quill connector. The each of the quills may be then inserted into the quill connector from outside of the porcupine training decoy along an insertion travel path. Each of the quills may be then physically retained by friction fit within each of the quill connectors and electrically connected by the spring-loaded quill contact in physical contact with the quill to allow the quills to be removed for storage, cleaning, or for replacement when the quills are damaged or broken. The porcupine training decoy may be 20 in. wide and 36 in. long.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
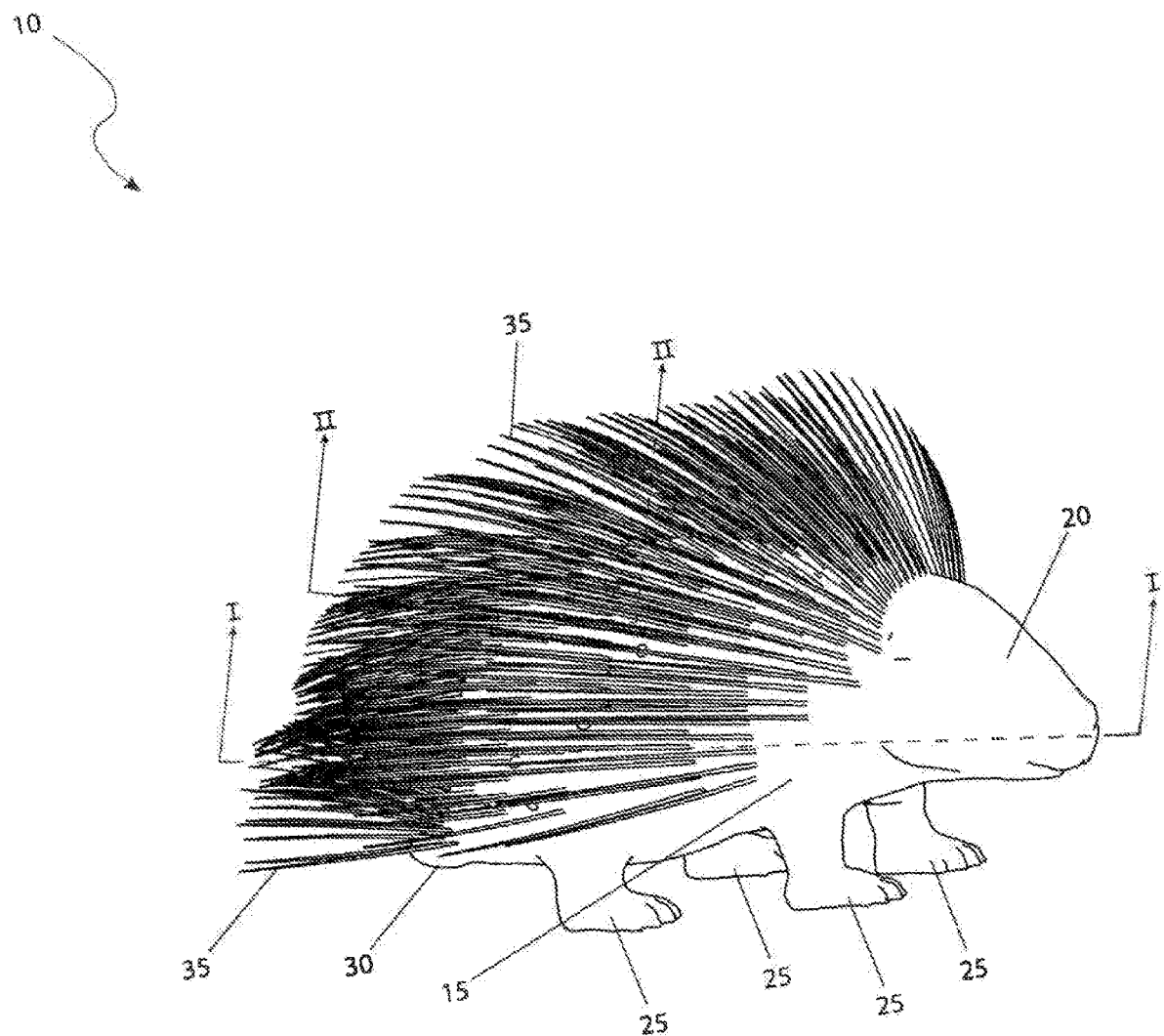
FIG. 1 is a side view of the porcupine training decoy, according to the preferred embodiment of the present invention.

DESCRIPTIVE KEY 10 porcupine training decoy
15 porcupine body shell
20 head
25 foot
30 tail
35 quill
40 weight reservoir
45 reservoir fill port
50 aromatic fabric patch
55 synthetic scent
60 natural smell
65 electronics enclosure
70 slot
75 power switch
80 voltage level controller
85 electrical connector
90 internal wiring harness
95 ground plate 100 single conductor
105 quill connector
110 quill contact
115 insertion travel path "i"
120 pet-in-training
125 first contact point
130 ground path circuit
135 second contact point
140 electrical shock
145 battery pack
150 pulse amplification circuit
155 step-up transformer

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a side view of the porcupine training decoy 10, according to the preferred embodiment of the present invention is disclosed. The porcupine training decoy (herein also described as the "decoy") 10, provides for a training aid to teach pets-in-training 120 to avoid porcupines. The decoy 10 comprises a porcupine body shell 15 that is generally hollow in nature. A head 20 and multiple feet 25 are provided as well to provide the overall impression of an adult porcupine in three (3) dimensions. It is envisioned that the overall size of the invention would be approximately twenty inches (20 in.) wide, thirty-six inches (36 in.) long, including a tail 30, and fifteen inches (15 in.) tall. It is designed to be self-standing on any outdoor surface such as pavement, grass, or the like. Finally, the backside of the porcupine body shell 15 is covered with quills 35. The quills 35 will be described in greater detail herein below.

Figure 2:
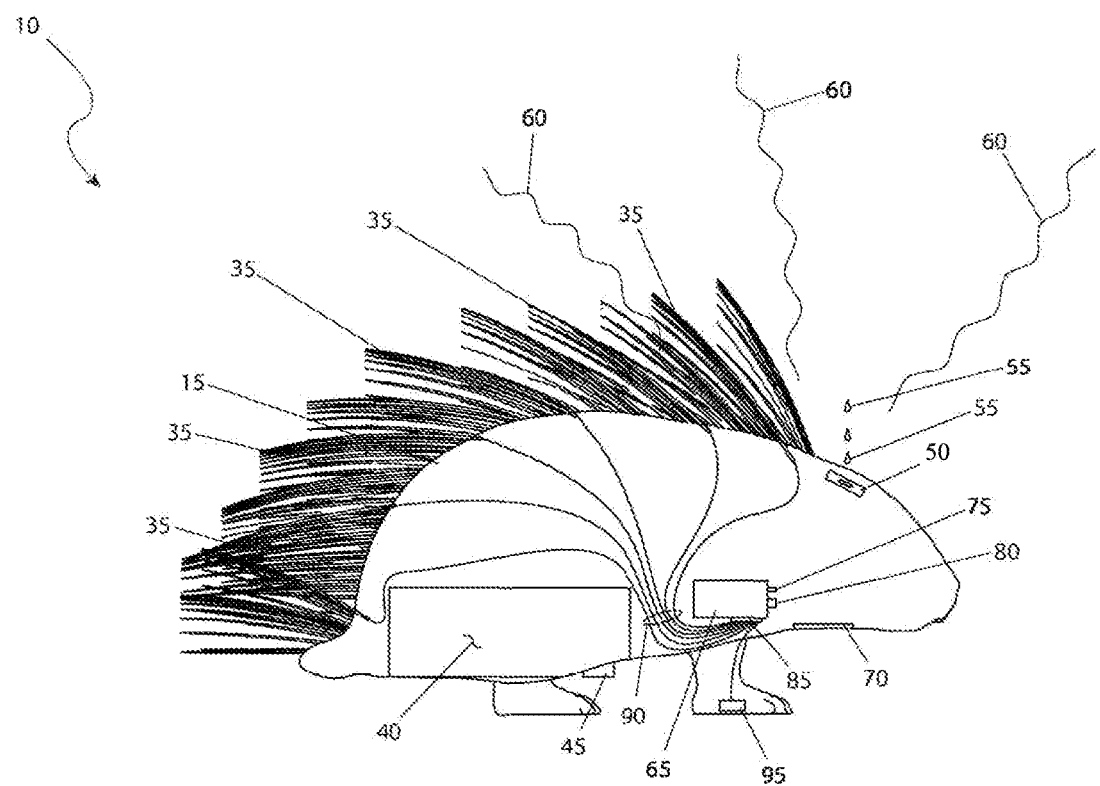
FIG. 2 is a sectional view of the porcupine training decoy, as seen along a Line I-I, as shown in FIG. 1, according to the preferred embodiment of the present invention.

Referring next to FIG. 2, a sectional view of the decoy 10, as seen along a Line I-I, as shown in FIG. 1, according to the preferred embodiment of the present invention is depicted. The lower portion of the decoy 10 is provided with a weight reservoir 40 which is accessed by a reservoir fill port 45 on the lower extreme of the porcupine body shell 15. The weight reservoir 40 would be filled by the user with an appropriate material such as sand, water, grain, or the like. The exact type of material used in the weight reservoir 40 is not intended to be a limiting factor of the present invention. The weight reservoir 40 provides stability for the decoy 10 and prevents it from being blown over or accidentally knocked over. At least one (1) aromatic fabric patch 50 is located on the upper surface of the porcupine body shell 15 and would be used to house a synthetic scent 55 applied by the user of the decoy 10. The synthetic scent 55 would recreate the natural smell 60 of a porcupine and is envisioned to be R-delta-decalactone (C10H18O2). An electronics enclosure 65 is accessed through a slot 70 in the lower forward portion of the porcupine body shell 15. It is provided with a power switch 75 and a voltage level controller 80, to control operation of the decoy 10. An electrical connector 85 allows the electronics enclosure 65 to be disconnected from an internal wiring harness 90. The removal of the electronics enclosure 65 allows for battery charging or replacement, repair or long-term storage of the decoy 10. The opposing end of the internal wiring harness 90 provides for connection to at least two (2) ground plates 95, each of which are located in a foot 25. The internal wiring harness 90 are also connected to many or all of the quills 35. Further detail on the electrical connection to the quill(s) 35 will be provided herein below.

Figure 3:
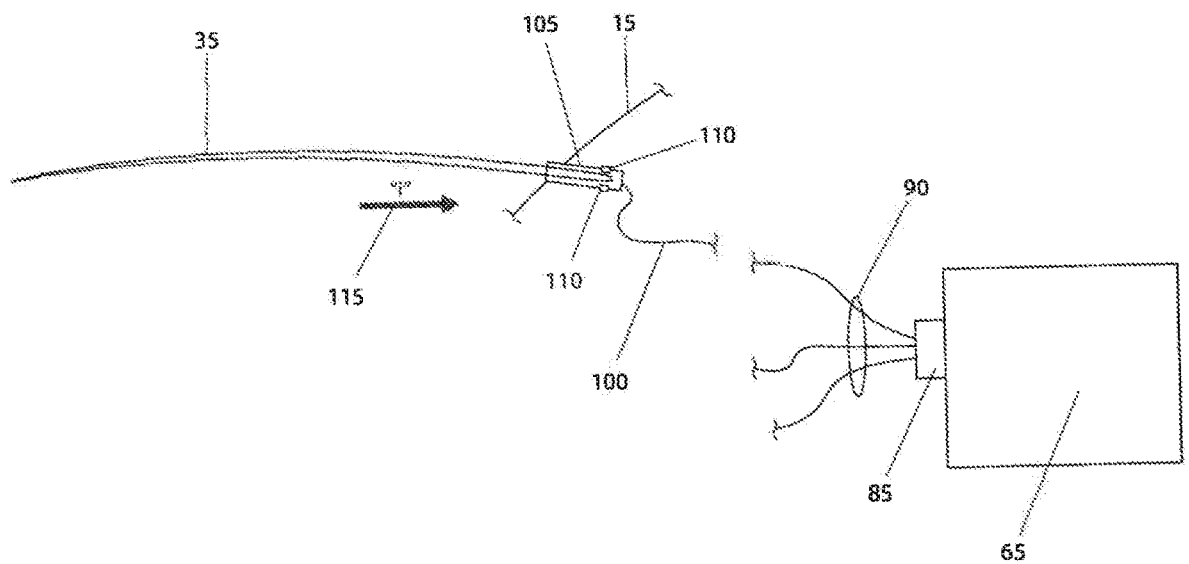
FIG. 3 is a sectional view of the porcupine training decoy, as seen along a Line II-II, as shown in FIG. 1, according to the preferred embodiment of the present invention.

Referring now to FIG. 3, a sectional view of the decoy 10, as seen along a Line II-II, as shown in FIG. 1, according to the preferred embodiment of the present invention is shown. This figure provides additional clarification on the mechanical and electrical connection associated with each quill 35. An electrical circuit from the electronics enclosure 65 is routed through the electrical connector 85 and the internal wiring harness 90. A single conductor 100 then terminates on the interior portion of a quill connector 105. The single conductor 100 then terminates on a spring-loaded quill contact 110 on the sides of the quill connector 105. A quill 35 is then inserted into the quill connector 105 from the exterior of the decoy 10 (as shown in FIG. 1), along an insertion travel path "i" 115. The quill 35 is then physically retained by friction fit within the quill connector 105, and electrically connected by the quill contact 110 in physical contact with the quill 35. These features allow the quills 35 to be removed for storage or cleaning, or for replacement in the case of damaged or broken quills 35. It is envisioned that the quills 35 would be made of semi-flexible conductive material such as semi-conductive plastic, or metal such as aluminum, copper, or steel.

Figure 4:
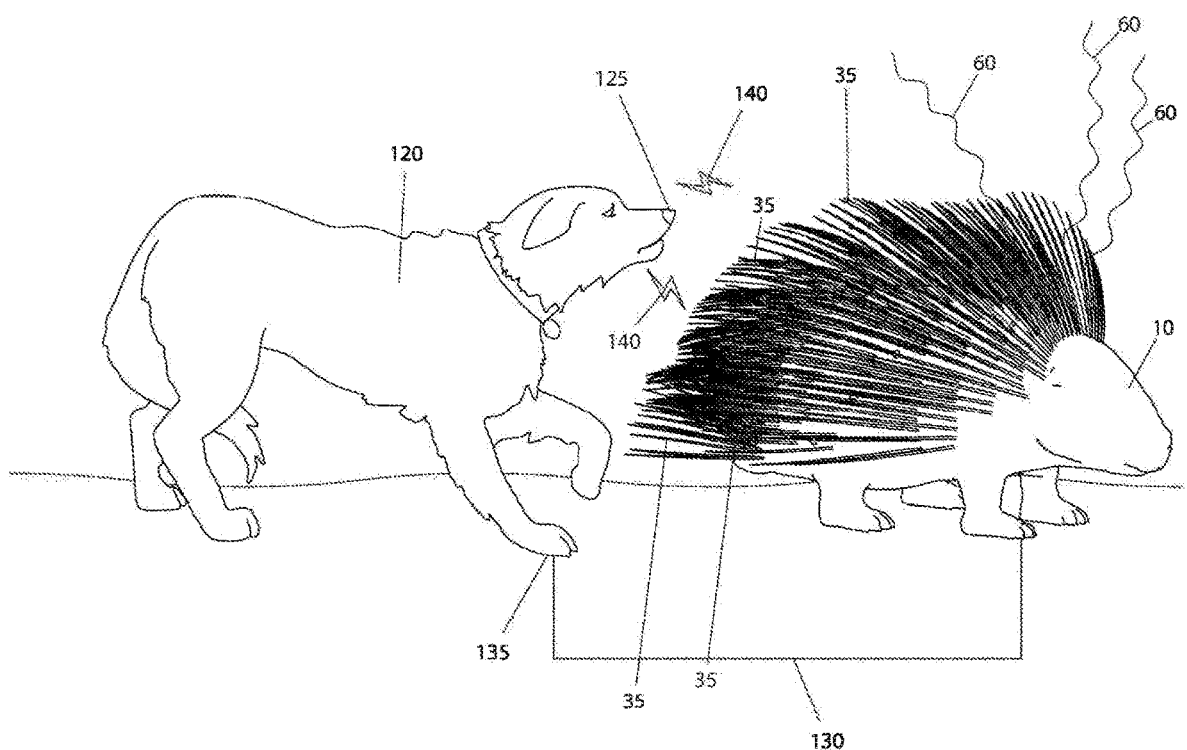
FIG. 4 is a perspective view of the porcupine training decoy, according to the preferred embodiment of the present invention.

Referring next to FIG. 4, a perspective view of the decoy 10, according to the preferred embodiment of the present invention is disclosed. A pet-in-training 120, herein depicted as a dog, is placed in the area of the decoy 10. The pet-in-training 120 is presented with the visual appearance of the decoy 10 which is also reinforced with the olfactory presence of the natural smell 60 emitted from the aromatic fabric patch 50 (as shown in FIG. 2). The pet-in-training 120 approaches the decoy 10 as shown and is likely to come in contact with one (1) or more of the quills 35. Doing so closes an electrical circuit between the electrified quills 35 and a first contact point 125 on the pet-in-training 120, herein depicted as the dog's nose. The electrical circuit is then completed by a pet-in-training 120 that runs from a spring-loaded second contact point 135 on the pet-in-training 120, herein depicted as the dog's foot, and the ground plates 95 (as shown in FIG. 2) on the decoy 10. The closure of the electrical circuit generates an electrical shock 140 at the pet-in-training 120. The intensity level of the electrical shock 140 can be varied by adjustment of the voltage level controller 80 (as shown in FIG. 2). It is envisioned that a lower level of electrical shock 140 would be used with young or small pet-in-training 120, while a higher level of electrical shock 140 would be used with older or larger pet-in-training 120. This process generates a negative reinforcement within the pet-in-training 120 to avoid any similar situation in the future with similar visual and olfactory stimulus. Periodic reinforcement of this process may be necessary throughout the life of the pet-in-training 120. Such avoidance of future incidents is envisioned to save the life of the pet-in-training 120 and/or eliminate large medical bills due to reduced encounters with real porcupines in the natural environment.

Figure 5:
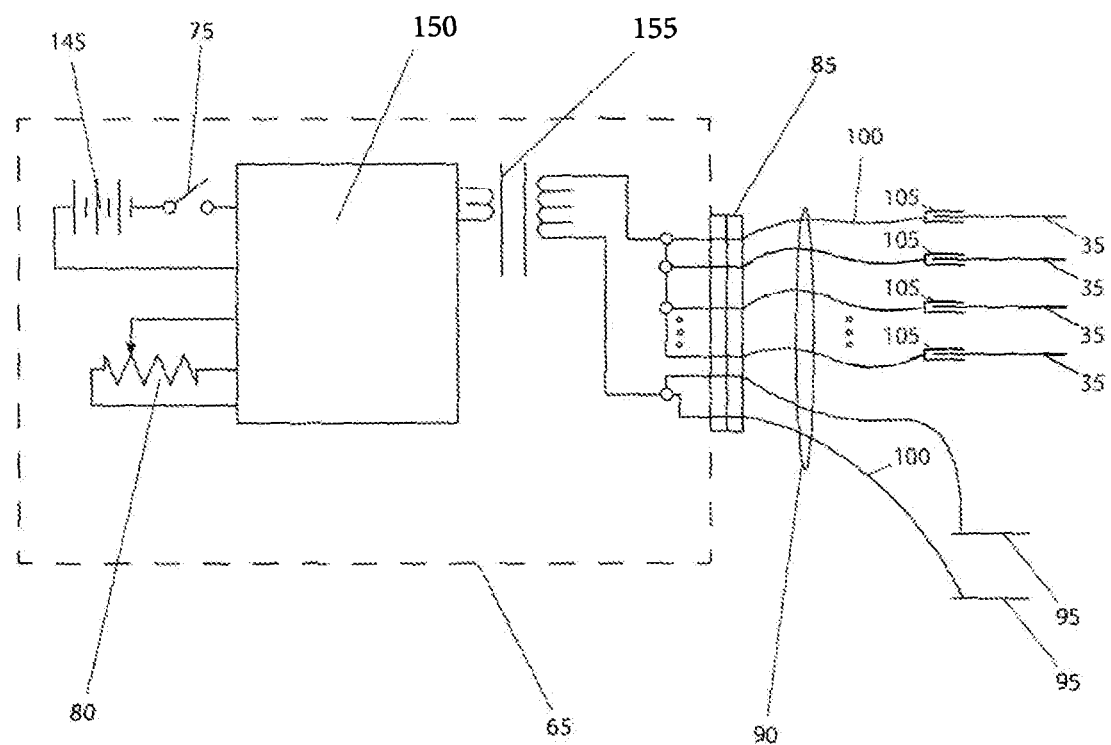
FIG. 5 is an electrical block diagram of the porcupine training decoy, according to the preferred embodiment of the present invention.

Referring to FIG. 5, an electrical block diagram of the decoy 10, according to the preferred embodiment of the present invention is depicted. Electrical power for the decoy 10 is provided by a battery pack 145. The power is then controlled by the power switch 75. Output power from the power switch 75 is routed to a pulse amplification circuit 150. The level of the pulse amplitude is controlled by the voltage level controller 80. The pulse output of the pulse amplification circuit 150 is routed to a step-up transformer 155. The output of the step-up transformer 155 is routed to the electrical connector 85 and out of the electronics enclosure 65. The exterior side of the electrical connector 85 is provided with the internal wiring harness 90. A single conductor 100 then connects to the ground plates 95 and the quill connectors 105. The quill connectors 105 then hold the quills 35 and provided the electrical connection via the single conductor 100 (a shown in FIG. 3).

2. Operation of the Preferred Embodiment

The preferred embodiment of the present invention can be utilized by the common user in a simple and effortless manner with little or no training. It is envisioned that the decoy 10 would be constructed in general accordance with FIG. 1 through FIG. 5. The user would procure the decoy 10 from conventional procurement channels such as pet stores, feed stores, hunting sporting goods stores, discount stores, department stores, mail order and internet supply houses and the like.

After procurement and prior to utilization, the porcupine training decoy 10 would be prepared in the following manner: The user would fill the weight reservoir 40 through the reservoir fill port 45 with an appropriate material; the battery pack 145 would be placed in the electronics enclosure 65; the electronics enclosure 65 would be connected via the electrical connector 85, the electronics enclosure 65 is the placed inside the porcupine body shell 15 via the slot 70; an appropriate level of electrical shock 140 would be selected by the voltage level controller 80, the quills 35 would be inserted into respective quill connectors 105 and the synthetic scent 55 would be applied to the aromatic fabric patch 50. At this point in time, the decoy 10 is ready for utilization.

During utilization of the decoy 10, the following procedure would be initiated: the decoy 10 would be placed on the desired horizontal surface such as grass or pavement; the power switch 75 would be placed in the ON position; a pet-in-training 120 would be allowed to approach the decoy 10 while observing visual and olfactory stimuli; when the pet-in-training 120 approaches closer, an electrical shock 140 would be administered from the quills 35, thereby teaching the pet-in-training 120 to avoid porcupines in the future. Such teachings may require periodic reinforcement.

After use of the porcupine training decoy 10, the quills 35 may be removed or replaced as necessary; the electronics enclosure 65 would be disconnected from the electrical connector 85 and removed from the porcupine body shell 15 via the slot 70. At this point in time the decoy 10 is stored until needed again.

The features of the decoy 10 are envisioned to be realistic appearance, affordable usage, easy to use, the use of realistic synthetic scent 55 which is more important than visual appearance to most pet-in-training 120, replaceable quills 35 in case of accidental removal or damage or for storage, powered by a battery pack 145 for use anywhere, and the easy application of synthetic scent 55 in cream or gel form.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A porcupine training decoy apparatus for teaching pets to avoid porcupines, the apparatus comprising:
   a hollow porcupine body shell defining an exterior surface resembling an adult porcupine, including a head and multiple feet to support the body shell in a self-standing position on outdoor surfaces, the body shell further including a backside covered with quills;
   a weight reservoir located within a lower portion of the body shell, accessible via a reservoir fill port, configured to be filled with a stabilizing material;
   at least one aromatic fabric patch positioned on an upper surface of the body shell for housing a synthetic scent replicating a porcupine's natural odor;
   an electronics enclosure housed within the body shell, accessible through a slot, comprising a power switch, a voltage level controller, and an electrical connector for connecting to an internal wiring harness, which connects to at least two ground plates located in the feet and to the quills;
   a plurality of quill connectors within the body shell configured to electrically connect the quills to the internal wiring harness, each quill being removably inserted into its respective quill connector, allowing for removal, replacement, or cleaning of the quills, wherein the quills are made of a semi-flexible conductive material; and
   a battery pack within the electronics enclosure providing electrical power, the power controlled by the power switch and adjusted by the voltage level controller, routed through a pulse amplification circuit and a step-up transformer to the electrical connector, the internal wiring harness, the ground plates, and the quill connectors, enabling an electrical shock to be delivered through the quills when contact is made by a pet; and,
   wherein the apparatus is configured to visually and olfactorily mimic an adult porcupine to teach pets-in-training to avoid contact, utilizing a combination of visual appearance, emitted synthetic scent, and administered electrical shock for negative reinforcement, an intensity of the electrical shock adjustable to accommodate pets of varying sizes and ages, with the apparatus being operable in a manner requiring minimal user training and capable of easy setup and storage by filling the weight reservoir, inserting the battery pack, connecting the electronics, selecting an appropriate shock level, inserting the quills, applying the synthetic scent, and subsequently placing the decoy on a horizontal surface for use, thereby providing an effective training tool to prevent pets from engaging with real porcupines in their natural environment.

* * * * *